(12) United States Patent
Reed

(10) Patent No.: US 8,302,241 B2
(45) Date of Patent: Nov. 6, 2012

(54) WHEEL WASHER

(76) Inventor: John W. Reed, Ellicott City, MD (US)

(*) Notice: Subject to any disclaimer, the term of this patent is extended or adjusted under 35 U.S.C. 154(b) by 576 days.

(21) Appl. No.: 12/437,229

(22) Filed: May 7, 2009

(65) Prior Publication Data

US 2010/0281638 A1 Nov. 11, 2010

(51) Int. Cl.
*B60S 3/00* (2006.01)
(52) U.S. Cl. ......... 15/53.4; 15/53.2; 15/53.3; 15/DIG. 2
(58) Field of Classification Search .............. 15/53.2, 15/53.3, 53.4, DIG. 2
See application file for complete search history.

(56) References Cited

U.S. PATENT DOCUMENTS

| | | | | |
|---|---|---|---|---|
| 3,236,960 A * | 2/1966 | Larson | ......................... | 200/61.41 |
| 3,626,537 A * | 12/1971 | Wilson | ............................ | 15/53.3 |
| 3,758,906 A * | 9/1973 | Takeuchi | ......................... | 15/53.2 |
| 3,795,928 A * | 3/1974 | Dolitzsch et al. | ............... | 15/53.2 |
| 4,809,720 A * | 3/1989 | Heraty | ............................ | 134/45 |
| 6,032,313 A * | 3/2000 | Tsang | ............................. | 15/22.1 |
| 7,673,362 B2 * | 3/2010 | Pulvermacher | ................ | 15/53.4 |
| 2003/0041398 A1 * | 3/2003 | Killingbeck | ................... | 15/53.1 |
| 2007/0151054 A1 * | 7/2007 | MacNeil | ............................ | 15/53.2 |
| 2008/0060150 A1 * | 3/2008 | Dollhopf | ........................ | 15/53.2 |

* cited by examiner

*Primary Examiner* — Robert Scruggs
(74) *Attorney, Agent, or Firm* — Foley & Lardner LLP

(57) ABSTRACT

A wheel washer includes a frame. The wheel washer also includes a arm attachable to the frame, the arm being capable of movement with respect to the frame. The wheel washer further includes a brush attachable to the arm, the brush being capable of movement both in and out with respect to a surface of the frame and being capable of rotation in either a clockwise direction or a counterclockwise direction. The arm can be an articulated arm or a multi-axis arm.

8 Claims, 9 Drawing Sheets

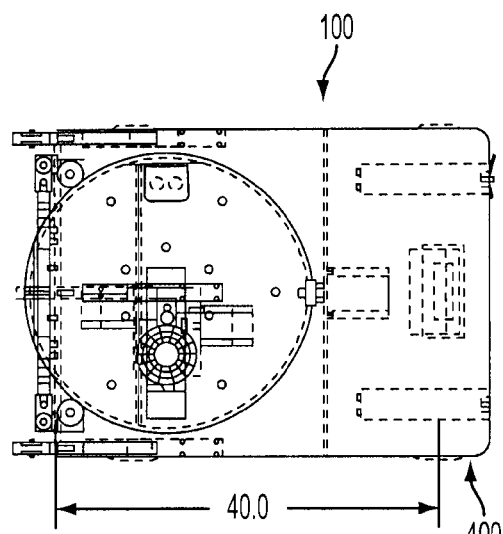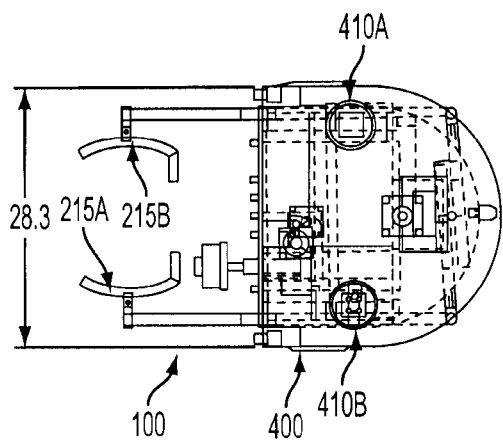
FIG. 4A  FIG. 4B
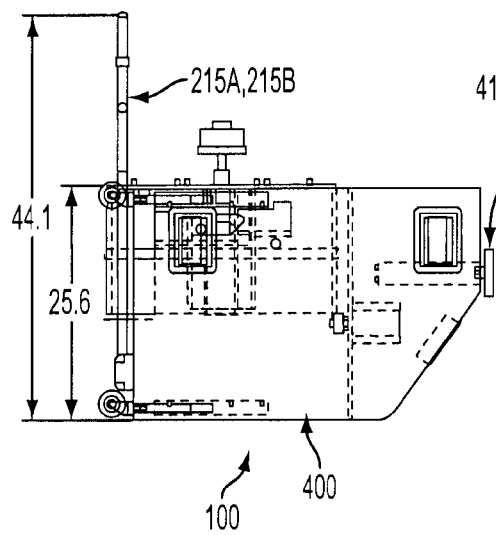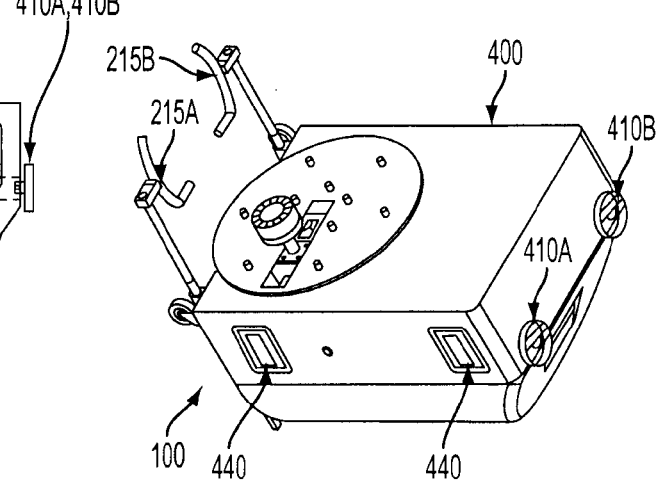
FIG. 4C  FIG. 4D

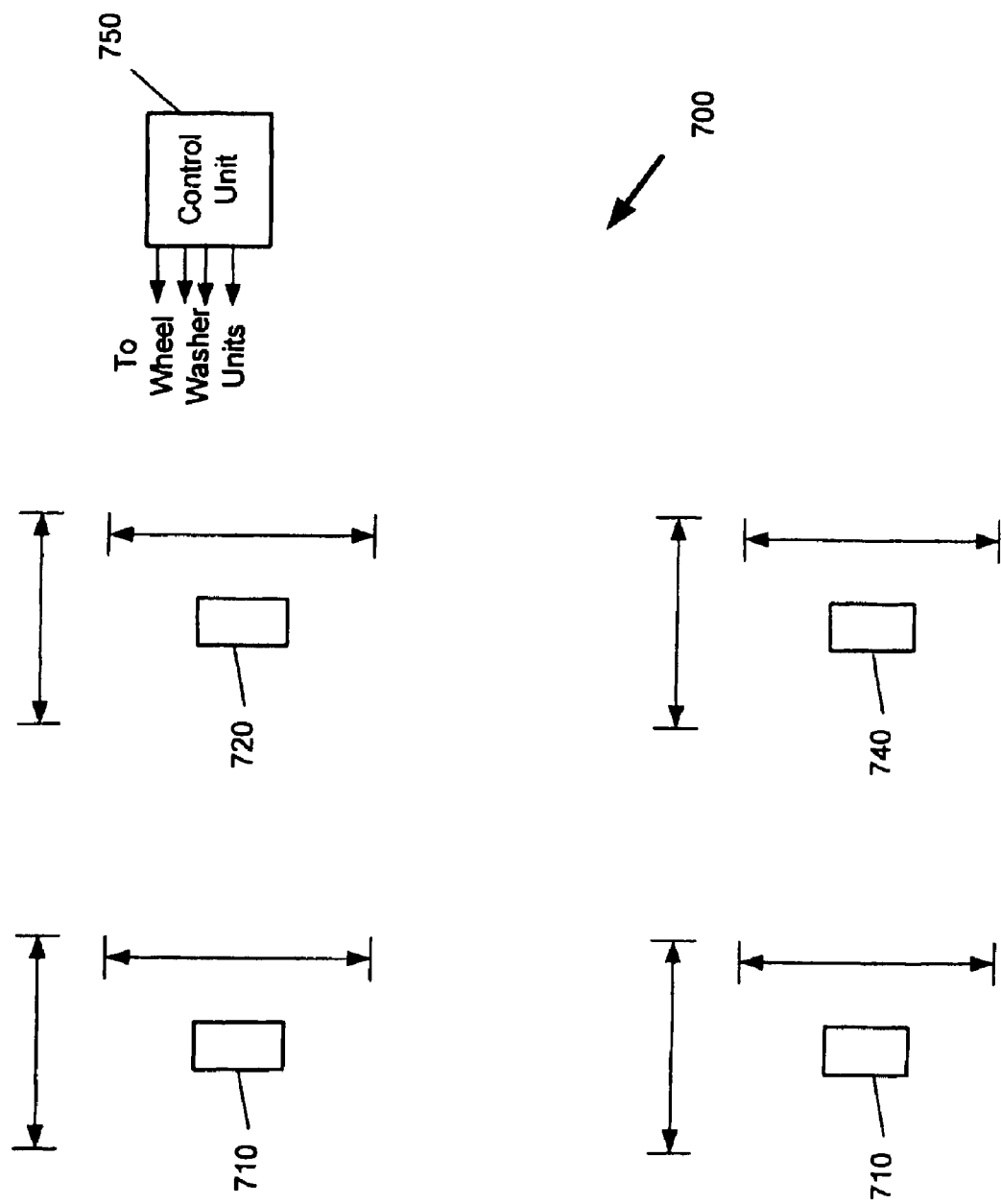

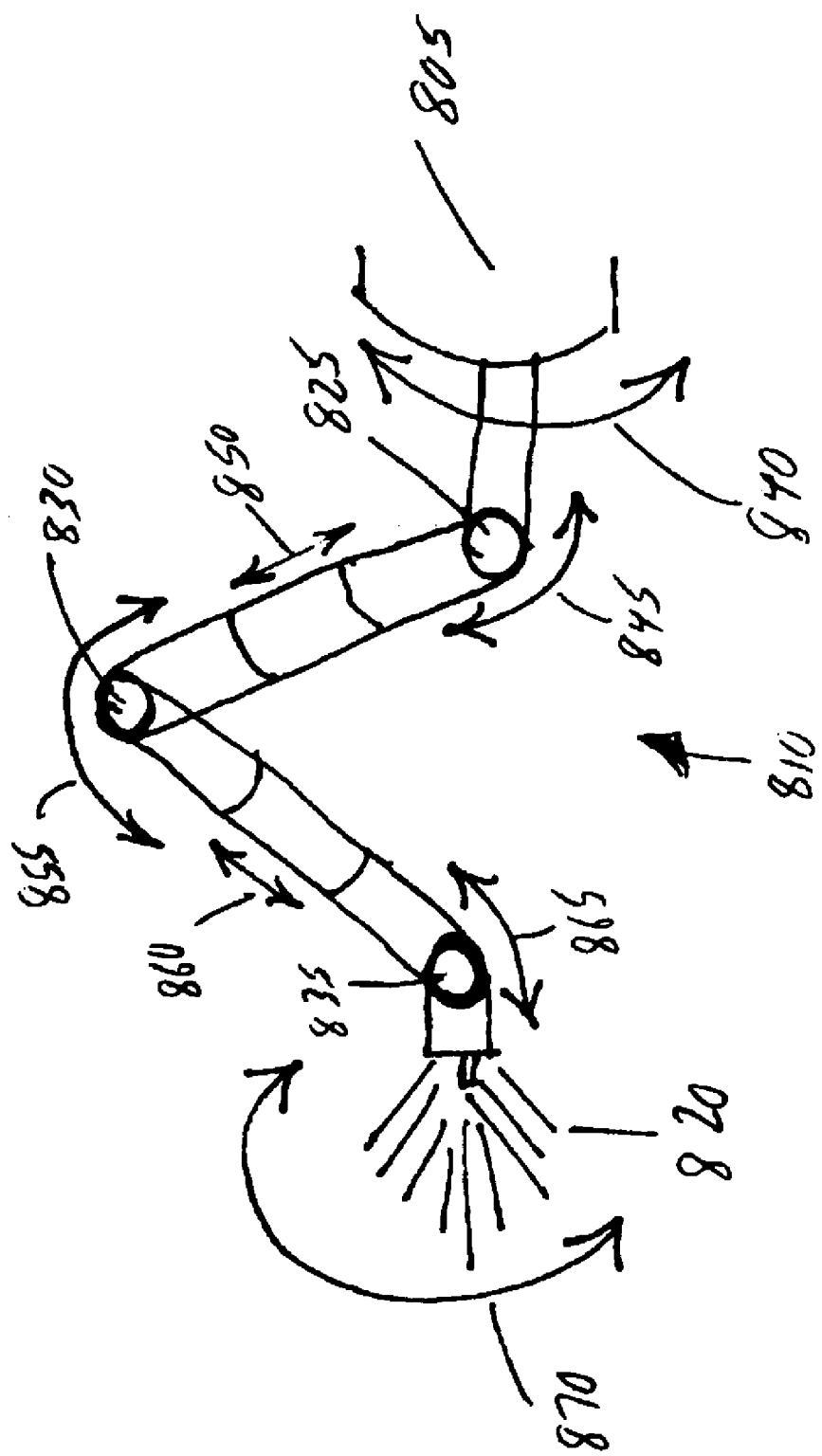

WHEEL WASHER

FIELD OF THE INVENTION

This invention is related in general to the field of wheel washers for automotive vehicles.

BACKGROUND OF THE INVENTION

Most vehicle owners (private & commercial) desire to keep their vehicles clean, for altruistic reasons and for common sense reasons. Everyone likes to have a clean car, and also it is not good to leave dirt and other contaminants (e.g., salt used to melt snow and ice from road surfaces) on an outer coat of a vehicle, since that can cause deterioration rust to form on the outer coat. To this end, most vehicle owners clean their cars periodically, such as on a month-to-month basis, either by cleaning it themselves or by going to a car wash establishment.

At a car wash establishment (or at home), a vehicle is driven into an enclosed region, whereby brushes and cloths are moved against the vehicle in order to clean the vehicle, while at the same time soap and water is sprayed onto the vehicle.

While the wheels of the vehicle are somewhat cleaned by taking a car to a car wash establishment, it is not common for those establishments to have special units for cleaning the wheels, wheel rims and hub caps of the vehicle. In more detail, small nooks and crannies exist within the wheel rims and hub caps, making those areas difficult to clean by car wash establishments without specialized equipment specifically designed to clean wheels. If a vehicle operator decides that he or she wants to clean the wheels themselves, the same problem exists in cleaning the wheels, and requires a great deal of effort and elbow grease to even partially clean the wheels.

Accordingly, there is desired a wheel washer device that is tailored to clean (either portably or permanently installed) wheels, rims and hub caps of a vehicle.

SUMMARY OF THE INVENTION

The present invention relates to a wheel washer apparatus.

In accordance with one aspect of the invention, there is provided a wheel washer that includes a frame. The wheel washer also includes an arm coupled to an outer surface of the frame. The wheel washer further includes a brush attachable to the arm, the brush being capable of movement both in and out with respect to the outer surface of the frame and being capable of rotation in either a clockwise direction or a counterclockwise direction.

In accordance with another aspect of the invention, there is provided a wheel washer system, which includes a plurality of wheel washer units. Each of the plurality of wheel washer units includes a frame; an arm coupled to an outer surface of the frame; and a brush attachable to the arm, the brush being capable of movement both in and out with respect to the outer surface of the frame and being capable of rotation in either a clockwise direction or a counterclockwise direction. The wheel washer system further includes a control unit configured to control positioning of the plurality of wheel washer units so as to respectively position the plurality of wheel washer units adjacent to a plurality of wheels of a vehicle of a particular length and width.

It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIGS. 4A-4D respectively front, top, side and perspective views of a wheel washer according to the first embodiment of the invention.

FIG. 7 shows positions for which separate wheel washers can be moved to accommodate a particular-sized vehicle, for a non-portable wheel washer system according to a second embodiment of the invention.

FIG. 8 shows an articulated arm that can be utilized in a wheel washer according to a third embodiment of the invention.

DETAILED DESCRIPTION

Figure 1A:
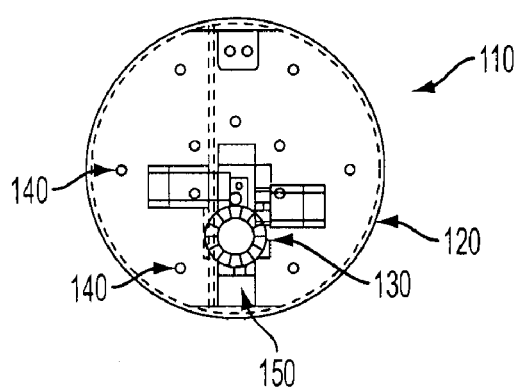
FIGS. 1A-1D respectively front, top, side and perspective views of a main mechanical operating device utilized in a portable wheel washer according to a first embodiment of the invention.
Figure 1B:
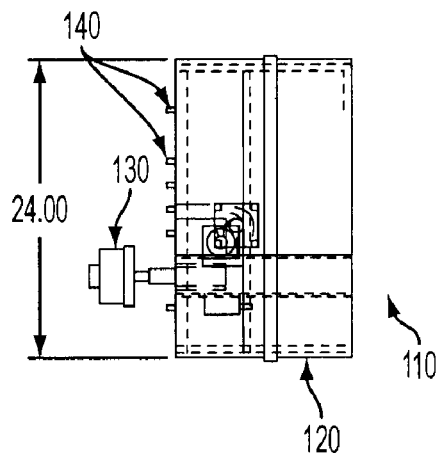
Figure 1C:
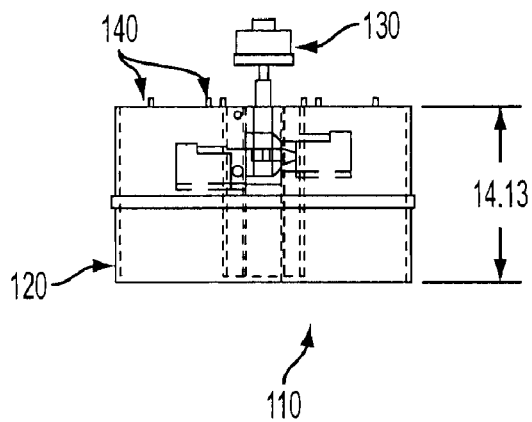
Figure 1D:
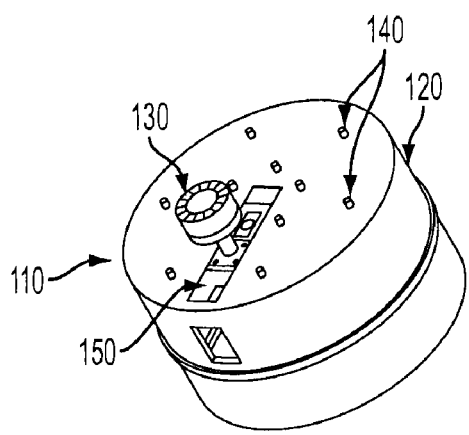
Figure 2A:
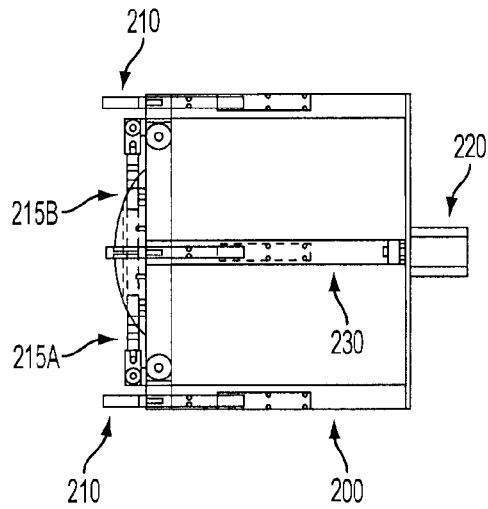
FIGS. 2A-2D respectively front, top, side and perspective views of a frame on which the main mechanical operating device is mounted, according to the first embodiment of the invention.
Figure 2B:
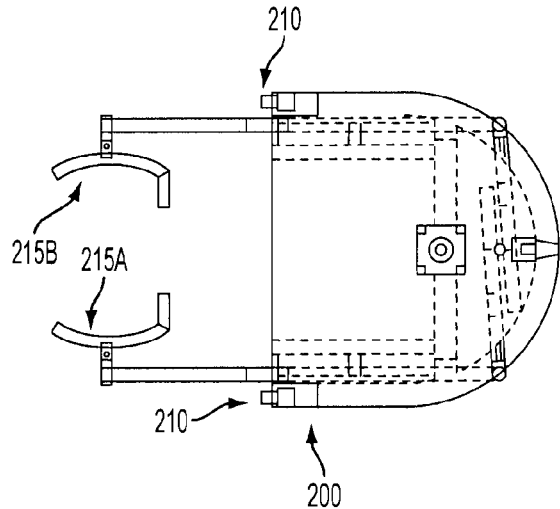
Figure 2C:
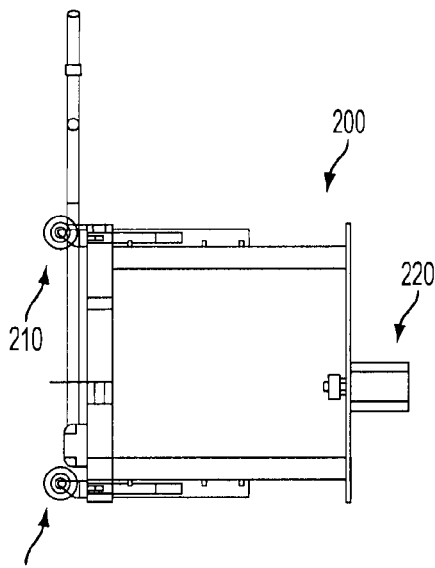
Figure 2D:
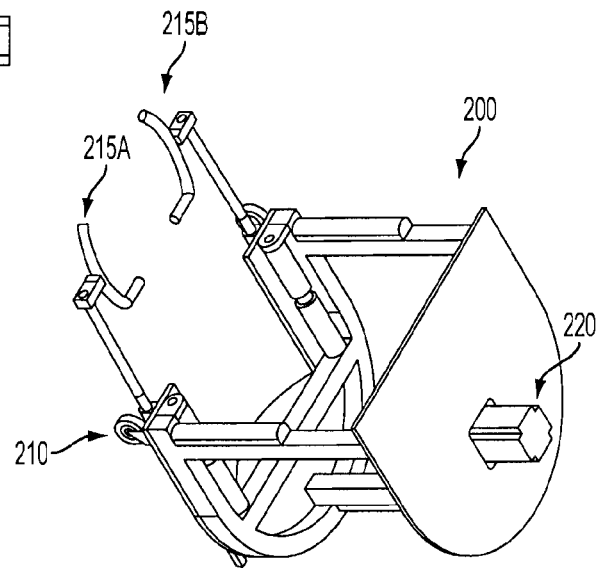
Figure 3A:
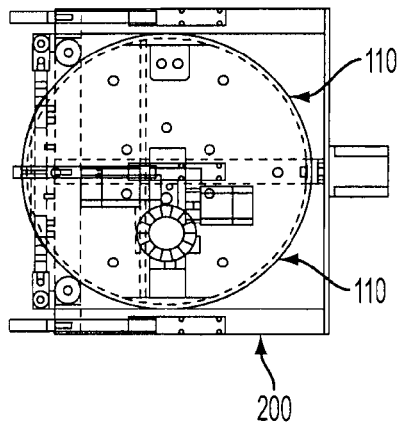
FIGS. 3A-3D respectively front, top, side and perspective views of the frame with the main mechanical operating device mounted thereon, in accordance with the first embodiment of the invention.
Figure 3B:
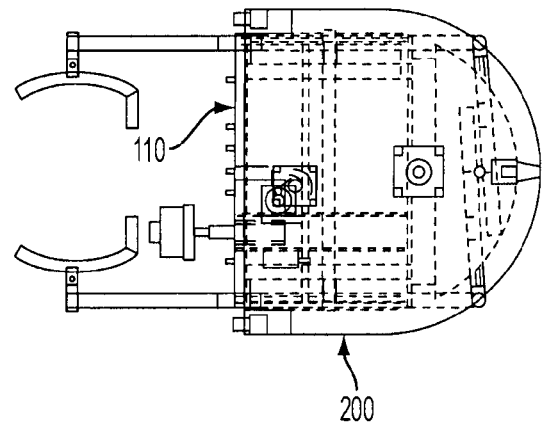
Figure 3C:
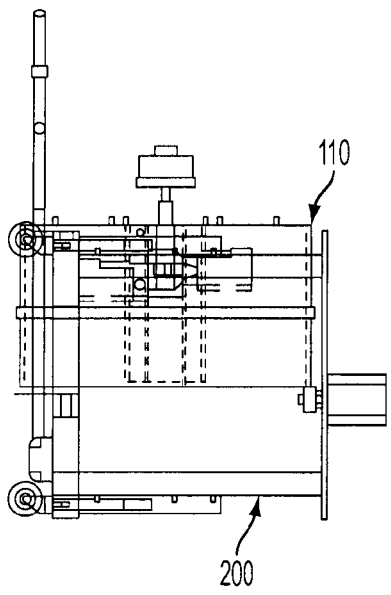
Figure 3D:
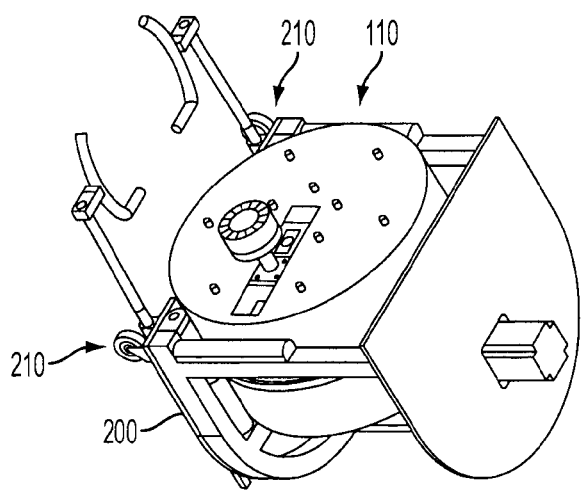
Figure 5A:
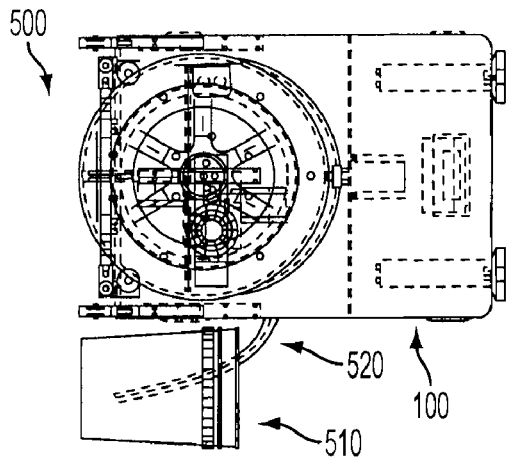
FIGS. 5A-5D respectively front, top, side and perspective views of a wheel washer with a wheel positioned adjacent to it for cleaning, according to the first embodiment of the invention.
Figure 5B:
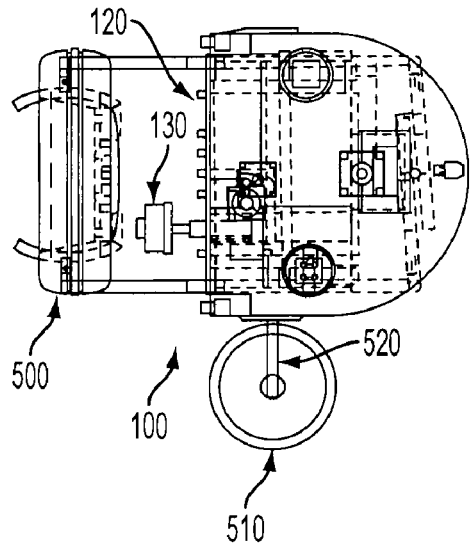
Figure 5C:
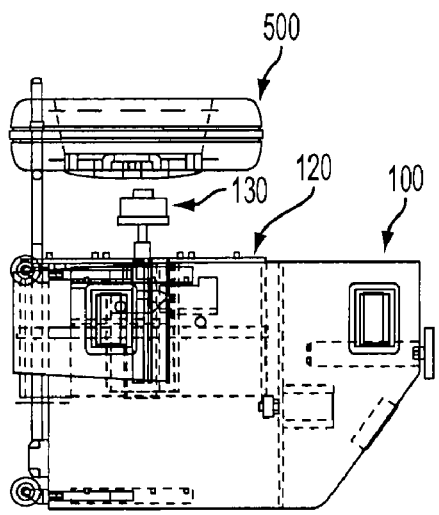
Figure 5D:
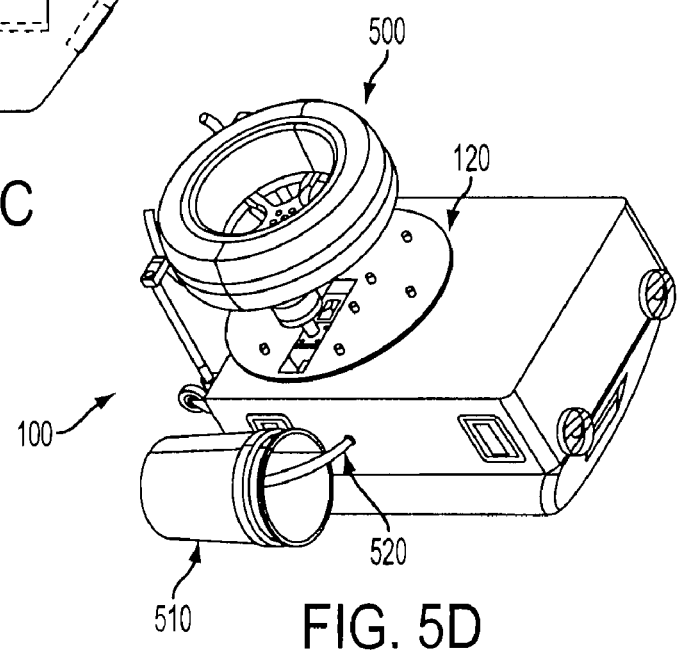

Reference will now be made in detail to embodiments of the invention, examples of which are illustrated in the accompanying drawings. An effort has been made to use the same reference numbers throughout the drawings to refer to the same or like parts.

Unless explicitly stated otherwise, "and" can mean "or," and "or" can mean "and." For example, if a feature is described as having A, B, or C, the feature can have A, B, and C, or any combination of A, B and C. Similarly, if a feature is described as having A, B, and C, the feature can have only one or two of A, B, or C.

Unless explicitly stated otherwise, "a" and "an" can mean "one or more than one." For example, if a device is described as having a feature X, the device may have one or more of feature X.

FIGS. 1A-1D show different views of a main mechanical operating device 110 utilized in a wheel washer according to a first embodiment of the invention. The main mechanical operating device 110 includes a cylindrical-shaped drum 120, which is a 24" diameter aluminum drum in one possible implementation of the first embodiment. The main mechanical operating device 110 also includes a brush 130 that extends out from the drum 120, and spray nozzles 140 provided on a face of the drum 120. The spray nozzles 140 are used to spray water and/or soap onto a wheel (not shown in FIGS. 1A-1D, which would be positioned next to the drum 120), for cleaning the wheel using the wheel washer. The wheel washer can be used to clean the wheel, the wheel rim, and a hubcap attached to the wheel rim.

The brush 130 is capable of moving along an entire length of a linear opening 150 provided on the face of the drum 120 in either a clockwise or a counterclockwise direction, and the brush 130 is capable of moving in and out on two planes. One plane is aligned with the face of the drum 120, and the other plane is aligned with the linear opening 150. The linear opening 150 is 1" wide by 11¾" inches long in one possible implementation, to thereby extend from a mid-point of the drum 120 to a periphery of the drum 120 (for a 24" diameter drum).

The drum 120 is mounted on a frame (see FIGS. 3A-3D) that allows the drum 120 to rotate 360 degrees, to thereby clean an entirety of a wheel positioned next to the drum 120. For a drum having a 24" diameter, a wheel up to a 24" diameter can be entirely cleaned. In alternative implementations of the first embodiment, a larger diameter drum, such as a 26" or 30" diameter drum, can be utilized to clean wheels of larger size.

FIGS. 2A-2D show different views of a frame 200 on which the main mechanical operating device 110 is mounted, according to the first embodiment of the invention. The frame 200 is shown as being mounted on rollers 210, and includes left and right clamps 215A, 215B for positioning the wheel washer in a proper position for cleaning a wheel. Instead of rollers 210, rubber pads can be utilized on the bottom of the frame 200, to provide for a stable base and to allow the wheel washer to be easily moved to a proper position for cleaning a wheel.

At the top of the frame 200 is provided a moving mechanism 220 that allows the drum 120 attached to the frame 200 to be raised or lowered to center the wheel washer to the center of a wheel to be washed by the wheel washer. As seen best in FIG. 2A, a shaft 230 is connected to the moving mechanism 220, whereby rotation of the moving mechanism 220 in a clockwise direction causes the shaft 230 to rotate in one direction, to thereby cause the frame 200 to be raised. Rotation of the moving mechanism 220 in a counterclockwise direction causes the shaft 230 to rotation in an opposite direction, to thereby cause the frame 200 to be lowered. The clamps 215A, 215B can be moved inwards or outwards, to thereby hold a wheel in place at a proper position with respect to the frame 200.

FIGS. 3A-3D show different views of the frame 200 with the main mechanical operating device 110 mounted thereon, in accordance with the first embodiment of the invention. The main mechanical operating device 110 is capable of rotating 360 degrees with respect to the frame 200. While rollers 210 are shown at the bottom of the frame 200, other types of movable mechanisms that provide a sturdy base for the frame 200 may be utilized, such as rubber or plastic pads.

FIGS. 4A-4D show different views of a wheel washer 100 according to the first embodiment, whereby these drawings are similar to those shown in FIGS. 3A-3D, respectively, except that a housing 400 is also provided for the wheel washer 100. The housing 400 has two rotating handles 410A, 410B extending from a top surface of the housing 400. The first handle 410A is rotatable, and is used to move the left and right clamps 215A, 215B either towards or away from each other, so that they can be snugly positioned against a wheel to be cleaned by the wheel washer 100, to thereby firmly hold the wheel in place with respect to the wheel washer 100. The second handle 410B is also rotatable, and is used to move the frame 200 either upwards or downward, depending upon which way the second handle 410B is rotated. The frame 200 is to be moved upwards or downward to thereby position the center the frame 200 at the center of the wheel to be cleaned.

An optional feature not shown in FIGS. 4A-4D is a control panel which can be provided, for example, on an upper front surface or a top surface of the housing 400, whereby a user can operate the control panel to: a) cause water and/or soap to be provided from the spray nozzles 140, b) move the frame 200 and/or clamps 215A, 215B without having to manually rotate the first and second handles 410A, 410B, c) cause the drum 200 to rotate either clockwise or counterclockwise, and d) cause the brush 130 to rotate clockwise or counterclockwise and/or cause the brush 130 to move inward or outward with respect to the drum 200 and/or cause the brush 130 to move up or down or stay fixed in position within the linear opening 150 provided on the face of the drum 200. Additional controls may be provided on the control panel to cause the drum 200 to rotate at a particular rate (e.g., slow, medium, or fast) and to cause the brush 130 to rotate at a particular rate. Grab handles 440 are provided at top and bottom locations on each of the side surfaces of the housing 400 (only one side surface can be seen in FIGS. 4A-4D), to allow a user to easily grab and thereby move the wheel washer 100 to a desired position. Also not shown in FIGS. 4A-4D is control logic whereby the control logic includes a computer processor and memory, so as to cause movements of the wheel washer 100 based on user inputs made to the control panel. The control logic can also use inputs from a measuring device (e.g., laser, radar, infrared or stereo video) to automatically determine the contours of a particular wheel to be cleaned, and to generate a computer program to clean the nooks and crannies of that wheel. The measuring device can include a plurality of output units (e.g., laser light sources, radio frequency (RF) units, etc.) provided on the surface of the drum and a plurality of detection units provided on the surface of the drum for detecting signals output by the output units that have been reflected from the wheel, so as to determine the particular contours of the wheel.

FIGS. 5A-5D show different views of the wheel washer 100 with a wheel 500 positioned adjacent to it for cleaning, according to the first embodiment of the invention. The wheel washer 100 is shown as a portable wheel washer, whereby a bucket 510 containing water and a siphon hose 520 are utilized to provide water to the wheel washer 100 to thereby clean the wheel 500. Those of ordinary skill will recognize that the wheel washer according to the invention can have non-portable configurations, as well, for example as part of an automatic washing system. Not shown in FIGS. 5A-5D is a soap holding region provided on an outer surface (e.g., top surface) of the housing 500, whereby a user can pour soap into the soap holding region, and whereby the soap is then provided to the brush 130 to allow the wheel 500 to be cleaned by way of soap and water and scrubbing force provided by the brush 130. Alternatively, instead of using a bucket 510 with water, the hose 520 can be directly connected to a water supply, to supply water to the wheel washer 100, in which a standard garden hose can be used instead of a siphon hose. Not shown in FIGS. 5A-5D is a vehicle which the wheel 500 is attached to, so as not to obfuscate those drawings with unnecessary objects that are not necessary in understanding the features and operation of the present invention.

The brush 130 is capable of moving inwards and outwards with respect to the drum 120, and can be programmed to rotate and move in a predetermined manner. At the same time, the drum 120 can be programmed to rotate at a particular rate and in a particular direction. The programming of this movement can be made by installing a computer readable medium, such as a compact disk (CD) or a digital video disk (DVD), into an opening (not shown) on the outer surface of the housing 400 of the wheel washer 100 (e.g., a slot provided on the control panel discussed above), whereby a computer processor (not shown) provided within the interior of the housing 400 (e.g., it may be the same computer processor as discussed above with respect to the control logic of the wheel washer 100, or it may be a separate computer processor) would execute a computer program read from the CD and would cause movement of the brush 130 and the drum 120 to suit a particular type of wheel to be cleaned. Alternatively or in concert therewith, a Read Only Memory (ROM) or a Random Access Memory (RAM) programmed with one or more brush cleaning programs can be installed in the wheel washer 100 during manufacture of the wheel washer 100, to allow a user to have a wheel washed by the wheel washer 100 according to a preset cleaning program. Fuzzy logic can be used to automatically generate a wheel cleaning program, in one possible implementation.

Figure 6B:
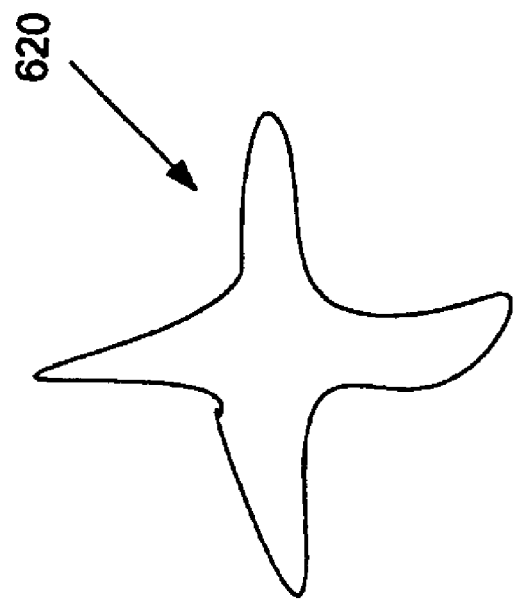
FIG. 6B shows a second particular cleaning pattern that can be programmed into the wheel washer to clean a wheel, according to the first embodiment of the invention.
Figure 6A:
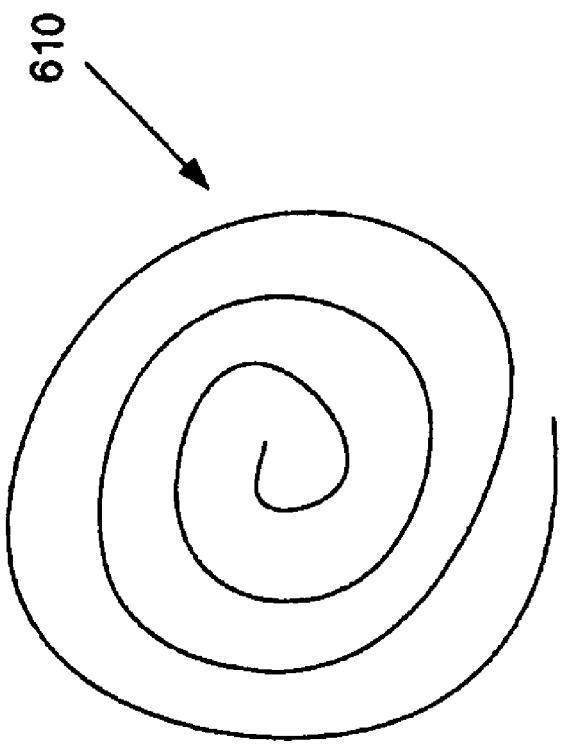
FIG. 6A shows a first particular cleaning pattern that can be programmed into the wheel washer to clean a wheel, according to the first embodiment of the invention.

FIG. 6A shows a first particular cleaning pattern 610, whereby this pattern corresponds to the brush 130 being slowly moved outward from an inside location within the linear opening 150 in which it is disposed, while at the same time the drum 120 is rotated in one direction. For example, cleaning pattern 610 may be used to clean wheels for Ford Mustangs, based on the particular design pattern for a Ford Mustang wheel rim. FIG. 6B shows a second particular cleaning pattern 620, whereby this pattern corresponds to the brush 130 being moved upwards and downwards within the linear opening 150 in which it is disposed, and with the drum 130 being rotated sometimes and being stopped from rotating at other times during a time when a wheel is being cleaned. Cleaning pattern 620 may be used to clean wheels for Toyota Corollas, based on the particular design pattern for a Toyota Corolla wheel rim.

In a second embodiment of the invention, which corresponds to a non-portable wheel washer system 700, there is provided a first wheel washer for a left front tire, a second wheel washer for a right front tire, a third wheel washer for a left rear tire, and a fourth wheel washer for a right rear tire. Each of the first through fourth wheel washers may have the same construction as described above with respect to the portable wheel washer 100 of the first embodiment, but whereby each of the first through fourth wheel washers of the second embodiment can only be moved a particular distance from a default location. The logic portion along with the power, control, soap and water can also be located remotely from the wheel washer 100. This would allow for the retrofitting of existing systems where these support systems already exist. For example, FIG. 7 respectively shows positions 710, 720, 730 and 740 of the first through fourth wheel washers, whereby those positions can be moved a certain amount from a particular default position (e.g., 6" to 8', see up-down and left-right arrows in FIG. 7) so as to accommodate a particular sized vehicle to be washed. A vehicle having its front wheels positioned 12 feet further than its rear wheels would have the positions 710 and 730 12 feet apart and the positions 720 and 740 12 feet apart. A vehicle having its front wheels positioned 15 feet further than its rear wheels would have the positions 710 and 730 15 feet apart and the positions 720 and 740 15 feet apart.

A control unit 750 provided for the fixed position wheel washer system 700 according to the second embodiment would allow for movements of the positions 710, 720, 730 and 740 of the first through fourth wheel washers to accommodate the distances between the front and rear wheels of any sized vehicle. Also, due to differences in widths of vehicles, the distances between positions 710 and 720 of the two front wheel washers and the distances between positions 730 and 740 of the two rear wheel washers can be controlled by the control unit 750 to accommodate the distances between the front wheels and the distances between the rear wheels of any sized vehicle. The control signals sent by way of the control unit 750 to the first through fourth wheel washers can be made either by wireless communications (e.g., rf or infrared communications) or by wired communications.

The non-portable wheel washer system according to the second embodiment can be utilized in a standard automatic car wash system or a self-serve car wash facility, whereby the wheels can be cleaned by the non-portable wheel washer system at the same time the rest of the vehicle is being cleaned by the car wash system. In such a setup, the control panel 750 may be provided on a wall of the car wash, to allow a car wash operator to move the first through fourth wheel washers to their proper positions to clean wheels of a particular-sized vehicle. Alternatively, sensors may be provided to detect positions of the four wheels of the vehicle, and to provide signals to the control panel 750 so that the control panel can move the first through fourth wheel washers to their proper positions. The first through fourth wheel washers to their proper positions can be provided on tracks to effect this movement. In the self-serve car wash facility, a vehicle owner can clean his/her vehicle interior while at the same time having the vehicle wheels cleaned by the wheel washer system, thereby saving time during the entire vehicle cleaning process.

In an alternative implementation of the second embodiment, only first and second wheel washers are used (e.g., wheel washers at positions 710 and 720 in FIG. 7), whereby the first and second wheel washers are positioned so as to clean front wheels of a vehicle, and then the vehicle is moved forward to use the first and second wheel washers to clean the rear wheels of the vehicle.

Referring back to FIGS. 1A-1D, the brush 130 is shown having an outer brush portion and an inner brush portion that extends slightly outwards with respect to the inner brush portion, whereby these two separate portions of the brush 130 can be separately controlled to rotate in separate or same directions with respect to each other. Also, soap can be controlled to flow through none, one or both of the inner and outer brush portions at any particular moment in time during a wheel washing cleaning operation. The outer brush portion is capable in one possible implementation to extend further outwards (e.g., 1" to 3") towards a wheel to be cleaned, to thereby allow for more rigorous cleaning of a particular portion of a wheel rim during a wheel cleaning process. Operations of the control panel provided on the housing 400 of the wheel washer allow for such control of the outer brush portion and the inner brush portion, whereby a preprogrammed wheel washer program stored in a CD or DVD (or stored beforehand in the memory provided within the housing 400) can allow for particular movements of these elements during an entire wheel washing cleaning process for cleaning a particular type of wheel, wheel rim and hubcap.

The brush 130 utilized in the first and second embodiments is 3" in diameter, but other sizes may be utilized while remaining within the spirit and scope of the invention (e.g., 2" up to 6" in diameter). The inner brush is 1" in diameter (but also can be anyway from ½" to 2" in diameter for different-sized brush implementations). The brush 130 is capable of being readily attached to and detached from the main mechanical operating device 110, such as by snapping it in place and by pulling it out with a small amount of force, to thereby allow one to readily clean the brush 130 by separating it from the rest of the wheel washer 100, and then easily attaching the clean brush 130 back onto the rest of the wheel washer 100. The brush 130 can be set up so that when rotating in one direction, the larger diameter brush is in use. When the brush rotates in the opposite direction, the inner smaller diameter brush extends out by utilizing a mechanical ratcheting action. This eliminates the need to change brushes, and allows for two shapes and sizes in a single configuration. The utility of the dual-brush implementation is that for certain cases, a single-sized and shaped brush cannot adequately clean a wheel, whereby the dual brush can do this.

FIG. 8 shows an articulated arm that can be utilized in a wheel washer according to a third embodiment of the invention. In the third embodiment, instead of having a rotating drum, an articulated arm 810 with a brush 820 provided at a distal end thereof is utilized to clean a wheel, rim and hub cap of a vehicle. The articulated arm 810 is capable of bending along first, second and third hinges 825, 830, 835, whereby the hinges allow for the arm 810 to move in any of a plurality of directions along x,y,z axes in order to clean a wheel. A proximal end of the articulated arm 810 is coupled to a base 805, and can move with respect to the base in the directions as shown by the arrow 840. The movement of the separate parts of the articulated arm 810 is shown by way of the respective arrows 845, 850, 855, 860 and 865, and the brush is capable of rotating in the direction of the arrow 870. Unlike the first and second embodiments, the base 805 does not rotate but rather is fixed in position during a cleaning of a wheel.

Figure 9:
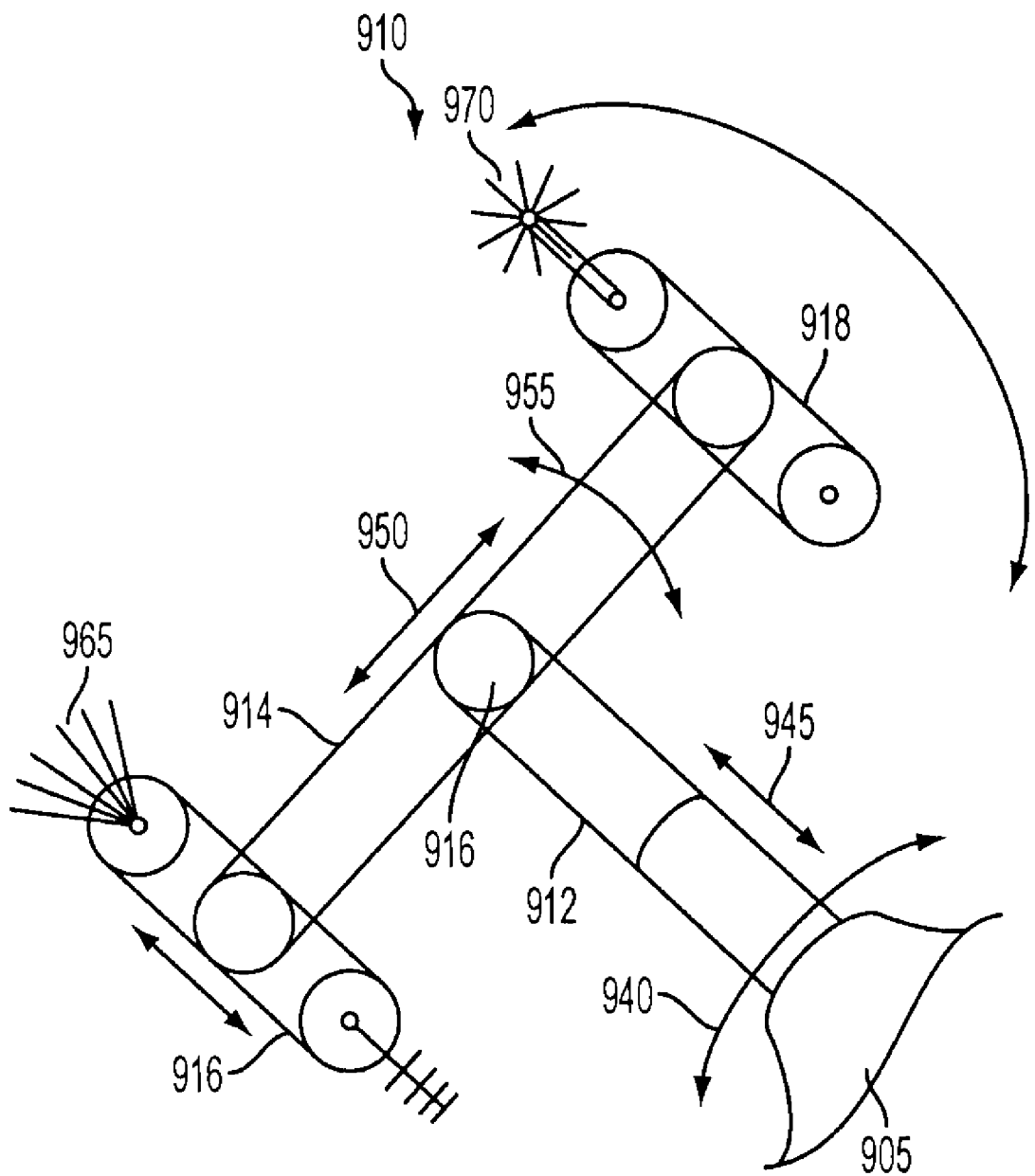
FIG. 9 shows a multi-axis arm that can be utilized in a wheel washer according to a fourth embodiment of the invention.

FIG. 9 shows a multi-axis arm that can be utilized in a wheel washer according to a fourth embodiment of the invention. A proximal end of a multi-axis arm 910 is coupled to a base 905, and can move with respect to the base in the directions as shown by the arrow 940. A first length 912 of the arm 910 is capable of extending and contracting in a direction as shown by the arrow 945. The first length 912 of the arm is attached to a second length 914 of the arm via a coupling 916, whereby the second length 914 of the arm 910 is capable of extending and contracting in a direction as shown by the arrow 950, and it is capable of rotating in a direction as shown by the arrow 955. The first length 912 of the arm 910 is disposed perpendicularly with respect to the second length 914 of the arm 910. At one end of the second length 914 is provided a third length 916 of the arm 910, and at the other end of the second length 914 is provided a fourth length 918 of the arm 910. The third and fourth lengths are capable of extending and contracting and rotating with respect to the other parts of the arm 910. Brushes 965 and 970 are provided at one end of the third and fourth lengths 916 and 918, respectively. Like the third embodiment, the base 905 does not rotate but rather is fixed in position during a cleaning of a wheel. Also, like the third embodiment, the arm 910 can move in any of a plurality of directions along x,y,z axes in order to clean a wheel.

The first through fourth embodiments of a wheel washer are different in structure but they accomplish the same result—reaching all parts of a wheel with a brush (or brushes) that moves in and out from a face of a wheel to be cleaned while the brush or brushes rotate(s) in either direction.

The embodiments described above have been set forth herein for the purpose of illustration. This description, however, should not be deemed to be a limitation on the scope of the invention. Various modifications, adaptations, and alternatives may occur to one skilled in the art without departing from the claimed inventive concept. For example, as a portable device a rechargeable DC lead gel cell battery can be used to provide power for the wheel washer, without having to use an AC electrical outlet for power. Also, again as a portable device, the soap provided to the wheel washer for cleaning a wheel can double as lubricant for the moving parts of the wheel washer. The spirit and scope of the invention are indicated by the following claims.

What is claimed is:

1. A wheel washer, comprising:
   a frame;
   an arm coupled to an outer surface of the frame, the arm being capable of movement with respect to the frame; and
   a brush attachable to the arm, the brush being capable of movement both in and out with respect to the outer surface of the frame and being capable of rotation in either a clockwise direction or a counterclockwise direction,
   wherein the brush includes an inner brush portion and an outer brush portion that surrounds the inner brush portion, and
   wherein the inner brush portion and the outer brush portion are capable of rotational movement in a first rotational direction or a second rotational direction,
   wherein the inner brush portion extends outwards with respect to the outer brush portion when the inner brush portion and the outer brush portion both rotate in the first rotational direction, so that the inner brush portion becomes more closely positioned than the outer brush portion with respect to a wheel of a vehicle to be cleaned by the wheel washer, and
   wherein the inner brush portion is positioned inwards with respect to the outer brush portion when the inner brush portion and the outer brush portion rotate in the second rotational direction opposite to the first rotational direction, so that the outer brush portion becomes more closely positioned than the inner brush portion with respect to the wheel of a vehicle to be cleaned by the wheel washer.

2. The wheel washer according to claim 1, wherein the arm has a first end hingedly or pivotably coupled to the frame and a second end on which the brush is attached.

3. The wheel washer according to claim 1, wherein the brush is detachable from the arm by application of a small force to the arm.

4. The wheel washer according to claim 1, wherein the frame comprises:
   a pair of clamps for holding a wheel in place with respect to the frame; and
   means for moving the frame upwards or downwards with respect to the wheel.

5. The wheel washer according to claim 4, wherein the frame further comprises:
   rollers attached to a lower surface of the frame, to allow the wheel washer to be easily moved from one position to another position.

6. The wheel washer according to claim 1, wherein the frame of each of the plurality of wheel washer units further comprises:

rollers attached to a lower surface of the frame, to allow the wheel washer to be moved from one position to another position by way of signals provided by the control unit.

7. The wheel washer according to claim 1, further comprising:
a ratchet device configured to move, by mechanical ratcheting action, the inner brush portion slightly outwards with respect to the outer brush portion when rotation of the inner brush portion and the outer brush portion changes from the second rotational direction to the first rotational direction.

8. The wheel washer according to claim 1, further comprising:
a control unit configured to receive information as to a particular shape and dimension of a wheel and/or hubcap of the vehicle,
wherein the control unit controls linear movement and rotational rate and rotational direction of the brush so as to clean the wheel and/or hubcap in accordance with the particular shape and dimension of the wheel and/or hubcap.

* * * * *